Maurice Bonnet & Georges Courtes
Inventors
By Littlepage, Quaintance, Wray & Aisenberg
Attys United States Patent Office 3,664,741
Patented May 23, 1972

3,664,741
METHOD AND DEVICES FOR THE CHROMATIC ANALYSIS OF AN OBJECT
Maurice Bonnet, Paris, and Georges Courtes, Marseille, France, assignors to Etablissement Public: Agence Nationale de Valorisation de la Recherche "Anvar," Hauts-de-Seine, France
Filed Dec. 23, 1969, Ser. No. 887,488
Claims priority, application France, Dec. 27, 1968, 181,027
Int. Cl. G01j 3/20
U.S. Cl. 356—74
9 Claims

ABSTRACT OF THE DISCLOSURE

A method for the chromatic analysis of an object including focusing a beam of light from the object onto a concave diffraction grating where an image is formed, the beam is then directed to a masked spherical mirror having at least one aperture therein, which thereby selects at least one band of wavelengths which is reflected onto a receiving surface. A chromatic analysis device for television has three apertures in the mask corresponding to the primary colors and the image is reconstituted on the screen of an electron beam tube. A plurality of lenses are disposed between the masked mirror and the screen for focusing the reconstituted image thereon. The device may be used for spectrophotometry wherein the focusing device employed is an apertured diaphragm with a spherical mirror. Throughout, the focusing device and the masked mirror are located on the Rowland circle of the diffraction grating.

---

The present invention relates to a method for the chromatic analysis of objects, and more particularly for the selection of wavelengths of the light beams from these objects, as well as devices for carrying out this method.

Generally, the selection of bands of wavelengths is effected by color filters or selection mirrors. Such a selection is a delicate operation and not very practical because the limit frequencies as well as the widths, profiles and amplitudes of the bands of wavelengths cannot be chosen.

A novelty search conducted at the Institut International de Brevets (I.I.B.) has revealed the following patents: German Pats. No. 935,528; French Pat. No. 1,451,120; and Swiss Pat. No. 330,185.

The German patent concerns a device for obtaining separate chromatic images from an object and includes a dispersing or scattering system having a prism. Further, since the resultant image is slightly dispersed, the field of use for wavelength selection is limited by the transparency of the prism. Finally, such a device is incapable of recombining the monochrome images after filtering.

The French patent concerns essentially an optical filter used in a spectrograph and which is likewise incapable of reconstituting the image of the object.

Finally, the Swiss patent concerns a simple wavelength spectrograph previously calibrated which is also incapable of reconstituting the image of the object.

An object of the present invention is to overcome the disadvantages of prior are device thereby providing an accurate method of spectrophotometric analysis of objects.

Accordingly, an object of the invention is a method for the chromatic analysis of objects comprising:

(a) Focusing a light beam from an object on a combination consisting of a concave diffraction grating having parallel elements, on which an image is formed on one of the elements, and of a mask fixed to a spherical mirror for selecting at least one wavelength, the pupil of the focusing means and the mask being located on the Rowland circle of the concave diffraction grating, and (b) Reconstituting the image on a receiving surface.

One of the advantages of this method is that in order to select one or more bands of wavelengths it is simply necessary to calculate a corresponding mask therefor.

A further aspect of the invention is a chromatic analysis device for carrying out the above disclosed method comprising: a focusing means for focusing a beam of light from an object, a combination including a concave diffraction grating on which an image is formed and a mask fixed to a spherical mirror for selecting at least one wavelength, the pupil of the focusing means and the mask being located on the Rowland circle of the diffraction grating and means for focusing the beam on a receiving surface for reconstituting the image on the diffraction grating.

According to an embodiment of the device for carrying out the method for use in color television, the chromatic analysis device includes a camera body having disposed therein a lens, a concave diffraction grating, and a mask, the mask and the lens being located on the Rowland circle of the diffraction grating for selecting three bands of wavelengths centered on red, green and blue and a spherical mirror disposed behind and in contact with the mask and wherein the receiving surface is the screen of an electron-beam tube and the means for focusing the image of the diffraction grating is a so-called multiple lens and disposed in the plane of the image on the diffraction grating, the focal plane image of the so-called multiple lens coinciding with the screen of the electron beam image tube.

This device is particularly useful for simultaneously comparing the intensity of selected bandwidths which is a result which cannot be achieved by wavelength selection with filters or semi-reflecting mirrors.

A further interesting application of the device according to the invention is in the field of spectrophotometry, the chromatic analysis device comprises a focusing means including a spherical mirror with a diaphragm having an aperture defining the entrance pupil, the receiving surface is a photosensitive plate or if so desired a projection screen for projecting the diffracted image, the means for focusing the image of the diffraction grating includes an optical system for enlarging associated with a field lens. Such a feature provides a wavelength filter for any desired wavelength or wavelengths. In order to have one or more selected wavebands, it is simply necessary to calculate a profile of the aperture or apertures in the mask. This feature substantially facilitates the use of chromatic analysis device according to the invention.

Other features and advantages of the present invention will become apparent from the description of the embodiments which is made by way of example in accordance with the accompanying drawings in which.

Figure 1:
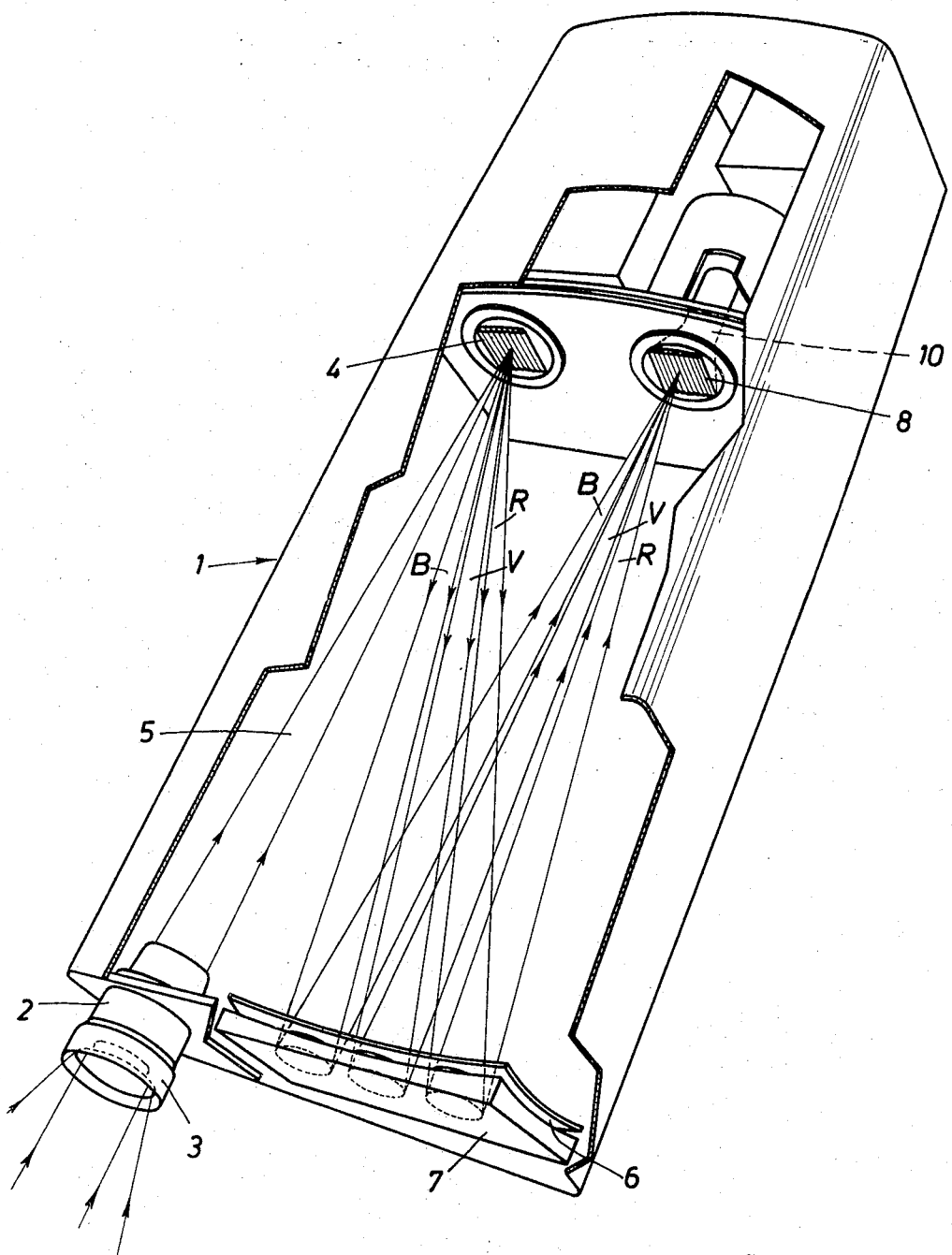
FIG. 1 is a partially cutaway view in perspective of a device for carrying out the method according to the invention for use in color television.

FIG. 1 shows a camera 1 for use in color television comprising a conventional lens 2 disposed in front of a focusing means 3 in order to enlarge the field if necessary without affecting the dimensions and the position of the pupils of the lens 2. The camera includes a combination comprising a concave diffraction grating 4 and a mask 6 which is fixed to a spherical mirror 7. The mask and the pupil of the lens are located in the Rowland circle of the diffraction grating 4. In the present embodiment a polychromatic beam 5 is focused by the lens and then diffracted by the concave diffraction grating 4. The diffracted rays are then filtered by the mask 6.

Figure 2:
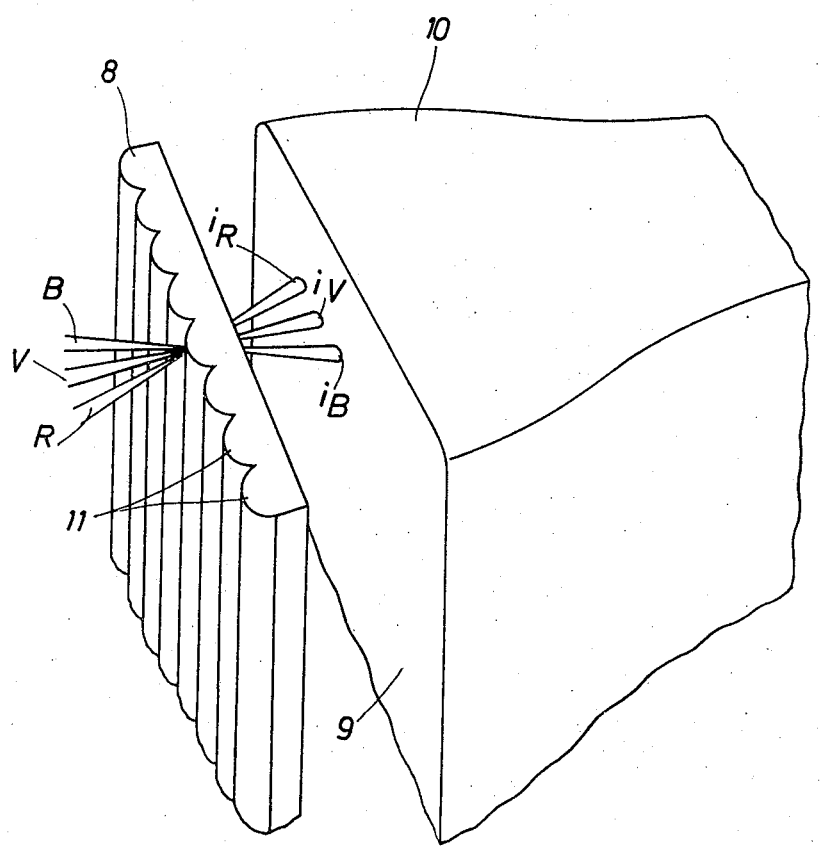
FIG. 2 is a partial schematic view in detail of a means for focusing the light beam on the receiving screen of FIG. 1.

The mask selects three monochromatic beams R, V and B which are centered on the red, green and blue wavelengths respectively. This bundles R, V and B are focused in a manner known per se on a frame 8 (FIG. 2) having a plurality of parallel semi-cylindrical lenses 11 whose focal image plane coincides with the screen 9 of the electron beam image tube 10. This frame of lenses 8 converts the three beams R, V and B into three elementary monochromatic images $i_R$, $i_V$, $i_B$ respectively on the screen 9. The beams diffracted by the concave diffraction grating 4 are generally normal to the plane of the mask 6 so that the three images $i_R$, $i_V$, $i_B$ are aligned in a plane parallel to the mask 6. Each point of a given object is thus decomposed on the screen 9 into a group of monochromatic images joined side by side.

The principal advantage of the camera as well as the method according to the invention is in the selection of the bandwidths by a mask associated with a concave diffraction grating.

The limit frequencies of the range of bandwidths as well as their widths, profiles and amplitudes can be chosen.

The image of a given object reconstituted by the camera 1 is such that the degree of illumination of each point of the reconstituted image is equal to the degree of illumination of the corresponding point of the object by a coefficient of transmission which depends on the wavelength used and is a function of the mask 6 chosen for this purpose. This coefficient of transmission is derived from the transmission function of the camera which is the convolution function of the pupil function relative to the mask function.

The mask 6 is in practice a plate having a plurality of apertures which can be of diverse configurations but which are generally symmetric with the diffraction plane (defined by the axes of the beams R, V and B in the camera of FIG. 1) and the mask function represents the semicord of the apertures or the distance from the axis to the aperture periphery at any position along the axis of symmetry of the apertures.

The pupil function represents the semi-cord of the entrance pupil at positions along the axis of symmetry of the apertures.

The pupil function represents the semi-cord of the entrance pupil at positions along the axis of symmetry of the pupil in the said plane of diffraction.

Complementary particulars relating to these convolution pupil and mask functions can be found in the following bibliographic references:

The Article of Goldberg McCulloch in "Applied Optic," p. 1451, vol. 1, No. 7, July 1969.

Diffraction Structure des Images" of Marechal and Francon, edited by "La Revue d'Optique," 1960.

Principles of Optic of Born and Wolf, Bergamon Press, 1959.

Therefore, starting with the coefficient of transmission the mask function i.e. the configuration of the apertures in the mask 9, required for the camera 1 to have this coefficient of transmission, can be determined.

The analysis of the elementary monochromatic images $i_R$, $i_V$ and $i_B$ formed on the screen 9 comprises scanning in a conventional manner the electric beam of an electron-beam tube in sequence across each of three monochromatic images, for example by a sweep of $n$ horizontal lines.

In the course of this photometric analysis, the spot of the electron beam of the electron beam tube 10 which for example is an orthicon tube scans the screen to provide a composite video signal comprising an image synchronizing signal, a line synchronizing signal and the video information converted into a train of pulses.

In the present case of a three-color analysis, the train of pulses comprises three components each one of which corresponds to one of the three primary colors, red, green and blue.

This information can of course be treated in a different manner in order to achieve the desired result. The present invention is not concerned with the use and treatment of such information.

Figure 3:
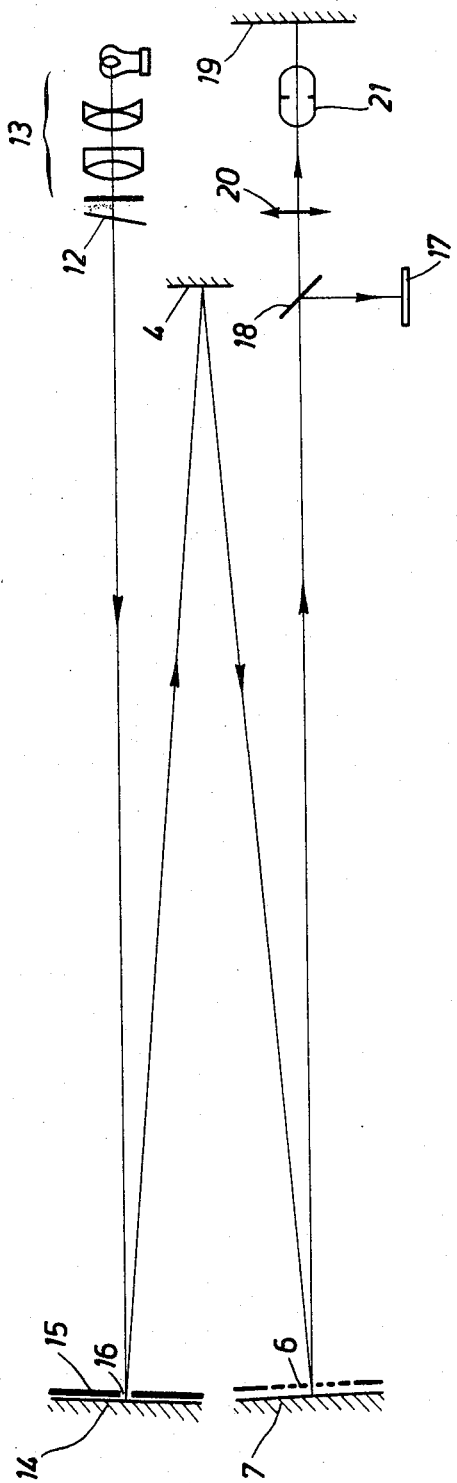
FIG. 3 is a diagram showing the principle of operation of a spectrophotometric device used for carrying out the method according to the invention.

The method according to the invention is obviously applicable to other fields, for example spectrophotometric analysis. FIG. 3 is a schematic showing of a spectrophotometric analysis device which operates in accordance with the method according to the invention. Where the elements of this analysis device are the same as that of the device shown in FIG. 1 they are indicated with the same references. In the present embodiment the object which is chosen to be analysed is a slide 12 whose image is projected by a projector 13. The image of the slide is projected onto the concave diffraction grating 4 by means of a spherical mirror 14 which is associated with a diaphragm 15 having an aperture which defines the pupil entrance 16 of the apparatus, the pupil is preferably disposed in the middle portion of the mirror 14.

The concave diffraction grating 4 diffracts beams towards the mask 6 which is fixed to the spherical mirror 7, the mask 6 and the pupil 16 being located on the Rowland circle of the concave diffraction grating 4.

The mask with its associated mirror 7 is interchangeable with the grating 4 without in any way changing the result, provided that the mask 6 and the pupil 16 remain on the Rowland circle of the concave diffraction grating 4.

The grating image is reconstituted either on a frame 17 carrying a photosensitive plate through the intermediary of a retractable plane mirror 18, or on a screen 19 after focusing with a field lens 20 and enlarged by optical system 21.

As in the camera embodiment of FIG. 1, the transmission function of the device is equal to the convolution function of the mask function by the pupil function.

The mask is formed in the present case to simultaneously select one or several bandwidths centered on the wavelengths corresponding to the chromatic analysis which is desired.

Instead of the slide any sort of image producing object such as films photographs or the like can of course be employed. If this object is at a very great distance for aerial photography for example it is necessary to focus on the field lens 20 with the optical system 21 and the device functions equally as well in the opposite direction. The mask 6 plays the role of the entrance pupil, the diffraction grating 4 diffracts the rays towards the diaphragm or mask 16 which selects the bandwidths or bandwidths chosen.

The mirror 14 focuses the diffracted image on the screen or the photosensitive plate (not shown) which is located substantially at the level of the slide 12.

This characteristic avoids having to transfer the lens combination 20–21 in the place of the slide-projector combination 12–13 of the device shown in FIG. 3 in the case where it is desired to analyze a distant object.

Among the possible applications of this device the following are noted as exemplary; the preparation of color films for use on color television, the determination of the color which must be used in order to create a special effect in the arts, in photography and film making to carry out a spectral analysis quickly; in the field of given wavelengths for checking foodstuffs, metallurgical products, textiles etc.

The great facility in the optimisation of bandwidths which are the function of an object observed is particularly interesting in the case of searching for an object of a known color disposed in the background having various dominant colors. The color contrast can be varied with great sensitivity in order to detect which is sought.

Finally, the present invention is obviously not limited to the embodiments and uses described and represented hereinabove but covers all possible variations within the scope of claims which follow.

We claim:

1. A device for the chromatic analysis of an object comprising: a focusing means for focusing a beam of light from an object for forming an image of said object on a diffraction grating, a concave diffraction grating for diffracting the focused beam of light, a concave spherical mirror having a mask fixed to a reflecting surface thereof, and having at least one aperture in the mask for selecting at least one band of wavelengths, the focusing means and the mask being arranged on the Rowland circle of the diffraction grating, and a receiving surface for receiving said band of wavelengths for reconstituting the image.

2. A device as claimed in claim 1 wherein the focusing means includes at least one lens.

3. A device as claimed in claim 1 for use in color television, wherein the focusing means, the masked mirror, the diffraction grating and the receiving surface are disposed in a camera body, and wherein three apertures are provided in the mask corresponding to the wavelengths of the primary colors.

4. A device as claimed in claim 3, wherein the receiving surface comprises the screen of an electron the beam image tube.

5. A device as claimed in claim 4, wherein a means for focusing selected wavelengths of the primary colors reflected from the masked mirror is provided including a plurality of semi-cylindrical lens arranged in the plane of the diffracted image and wherein the focal plane image of the means for focusing coincides with the screen of the electron beam image tube.

6. A device as claimed in claim 1 for use in spectrophotometry, wherein the focusing means includes a spherical mirror and a diaphragm having an aperture thereby defining the entrance pupil of the device.

7. A device as claimed in claim 6, wherein the receiving surface is a photosensitive plate.

8. A device according to claim 6, wherein the receiving surface is a screen, and further comprising a means for focusing said selected band of wavelengths reflected from the masked mirror including a field lens and an optical system for enlarging.

9. The method for chromatic analysis and reconstitution of an object comprising:
positioning a focusing means having a pupil on a Rowland circle of a concave diffraction grating,
focusing a beam of light from an object through the pupil on the diffraction grating,
diffracting the focused beam with the diffraction grating,
reflecting the diffracted beam from the diffraction grating to a concave mirror contiguous with the Rowland circle of the diffraction grating,
masking a portion of a reflecting surface of said concave mirror to select at least one band of wave lengths, reflectively focusing the selected band of wave lengths back through the mask onto an image reconstituting means, and constituting an image of the object with the selected band of wave lengths.

References Cited

UNITED STATES PATENTS 2,823,577  2/1958  Machler _____ 356—82

FOREIGN PATENTS 1,434,980  1966  France _____ 356—79

OTHER REFERENCES

Young: IBM Technical Disclosure Bulletin, vol. 8. No. 1, June 1965, pp. 111 and 112.

RONALD L. WIBERT, Primary Examiner

F. L. EVANS, Assistant Examiner

U.S. Cl. X.R.

178—5.4 E; 350—162 R; 356—79, 96, 178